United States Patent [19]
Arrott

[11] Patent Number: 5,704,558
[45] Date of Patent: Jan. 6, 1998

[54] AUTOMATED RECYCLING CENTER FOR ALUMINUM CANS

[75] Inventor: Dewayne D. Arrott, Waxahachie, Tex.

[73] Assignee: Can Depot, L.P., Dallas, Tex.

[21] Appl. No.: 741,869

[22] Filed: Sep. 16, 1996

[51] Int. Cl.$^6$ .................. B02C 19/12; B02C 23/08
[52] U.S. Cl. .................. 241/47; 241/79.1; 241/100
[58] Field of Search .................. 241/79.1, 47, 100, 241/DIG. 38, 99

[56] References Cited

U.S. PATENT DOCUMENTS

| | | | |
|---|---|---|---|
| 4,009,838 | 3/1977 | Tashman | 241/99 |
| 4,059,050 | 11/1977 | Davis, Jr. | 100/91 |
| 4,141,493 | 2/1979 | Arp | 235/448 |
| 4,241,821 | 12/1980 | Wu et al. | 194/4 C |
| 4,245,731 | 1/1981 | Herbert et al. | 194/4 C |
| 4,257,511 | 3/1981 | Miller | 194/4 R |
| 4,260,419 | 4/1981 | Robertson | 75/142 |
| 4,269,632 | 5/1981 | Robertson et al. | 148/2 |
| 4,282,044 | 8/1981 | Robertson et al. | 148/2 |
| 4,316,533 | 2/1982 | Hughes et al. | 194/4 C |
| 4,387,019 | 6/1983 | Dale et al. | 209/12 |
| 4,402,391 | 9/1983 | Tuten et al. | 194/4 C |
| 4,412,608 | 11/1983 | Kaspar et al. | 194/4 D |
| 4,463,844 | 8/1984 | Huffman et al. | 194/4 C |
| 4,480,737 | 11/1984 | Jamgochian et al. | 194/4 C |
| 4,492,295 | 1/1985 | DeWoolfson | 194/4 C |
| 4,499,824 | 2/1985 | Elwing et al. | 100/48 |
| 4,499,984 | 2/1985 | Tuten et al. | 194/4 C |
| 4,505,370 | 3/1985 | Swenck | 194/4 C |
| 4,532,859 | 8/1985 | Solørdal | 100/35 |
| 4,558,775 | 12/1985 | LaBarge et al. | 194/4 C |
| 4,576,289 | 3/1986 | Jarrett et al. | 209/631 |
| 4,597,487 | 7/1986 | Crosby et al. | 194/209 |
| 4,653,627 | 3/1987 | Hampson et al. | 194/209 |
| 4,787,495 | 11/1988 | Tuten et al. | 194/209 |
| 4,953,682 | 9/1990 | Helbawi | 194/208 |
| 5,155,975 | 10/1992 | Knowler | 241/100 X |

*Primary Examiner*—John M. Husar
*Attorney, Agent, or Firm*—H. Dennis Kelly; Timmons & Kelly

[57] ABSTRACT

Cans can be loaded into the automated recycling center by placing the cans into an input slot on the front of an outer container. The cans then fall into a chute, where air pressure from a blower blows the cans upward and rearward through the chute to a shredder. Cans and other items that are unacceptable will fall out of the chute into a primary rejection chute, and then to an exit slot on the side of the container. Items that are only slightly too heavy will be blown upward, but will fall into a secondary rejection chute, and then to the exit slot. Cans that are acceptable will be blown to a shredder are the rearward end of the chute. The shredded cans fall into a collection box, mounted on wheels, and supported by a load cell scale. The scale weighs the shredded cans, and the center calculates the proper payment and issues a receipt and payment. Doors on the side of the container can be opened and the collection box removed for easy removal of the shredded aluminum.

9 Claims, 2 Drawing Sheets

AUTOMATED RECYCLING CENTER FOR ALUMINUM CANS

BACKGROUND OF THE INVENTION

1. Field of the Invention

This invention relates in general to an apparatus for receiving metal cans, primarily aluminum, and for paying for the metal. In particular, the invention relates to an apparatus for receiving, shredding, weighing, and paying for a quantity of metal cans.

2. Description of Related Art

Recycling has become a growth industry, particularly the recycling of aluminum from beverage cans. Many governmental agencies and private companies are making recycling an integral component of their solid waste management plans.

In the past, people have collected empty aluminum cans and delivered the cans to recycling centers. At the centers, someone would sort out the unacceptable material, such as tin cans, and would weigh the aluminum cans. Then, someone would pay the depositor for the acceptable aluminum. The cans would then be crushed and transported to a recycling plant.

Of course, if the process could be automated, the depositor could deposit the cans and receive payment without anyone else's presence being required. Many different types of automated recycling centers have been invented and tried.

For example, U.S. Pat. No. 4,499,984, issued to Tuten et al., discloses an automated recycling center. This patent shows a fully automated apparatus for collecting, weighing, and paying for aluminum cans. The apparatus is controlled by a digital electronic controller, well known in the industry.

One of the most difficult tasks of an automated recycling center is the separating of the aluminum from the unacceptable material. Most of the prior art automated recycling centers have used magnets to remove the ferrous material from the aluminum material. This method works well as long as all of the unacceptable material is attracted to magnets. Unfortunately, there is often a lot of nonmagnetic unacceptable material in the aluminum cans that people try to redeem, such as leftover beverages, water, and rocks. Some more accurate method of separating out unacceptable material was required.

Another difficult task required of automated recycling centers is the transportation of the aluminum cans through the center. Most prior art automated recycling centers have used conveyor belts to move material through the centers. Unfortunately, in very cold weather, and in some other conditions, conveyor belts have been unreliable. A more reliable method of moving the aluminum cans through the centers was desired.

SUMMARY OF THE INVENTION

The general object of the apparatus of the invention is to automatically collect, sort, shred, weigh, and pay for aluminum cans deposited into the apparatus. In general, this object is accomplished by an automated recycling center having an outer container with an input slot, a shredder, a collection box for collecting the shredded cans, a duct connecting the input slot to the shredder, and a blower for creating an airflow through the duct to carry the metal cans from the input slot to the shredder.

The above, as well as additional objects, features, and advantages of the invention will become apparent in the following detailed description.

DESCRIPTION OF THE PREFERRED EMBODIMENT

Figure 1:
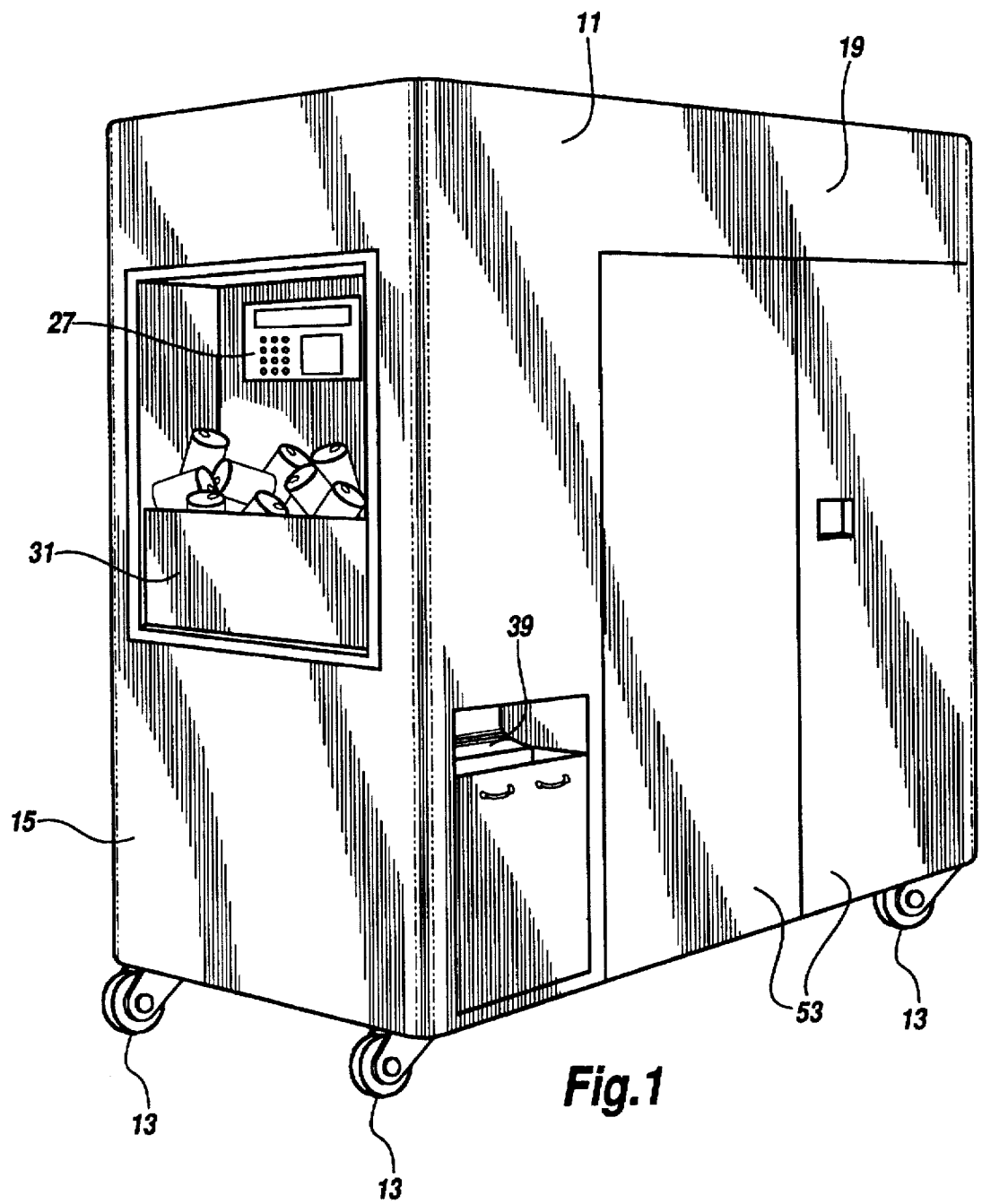
FIG. 1 is a perspective view of the automated recycling center of the invention.
Figure 2:
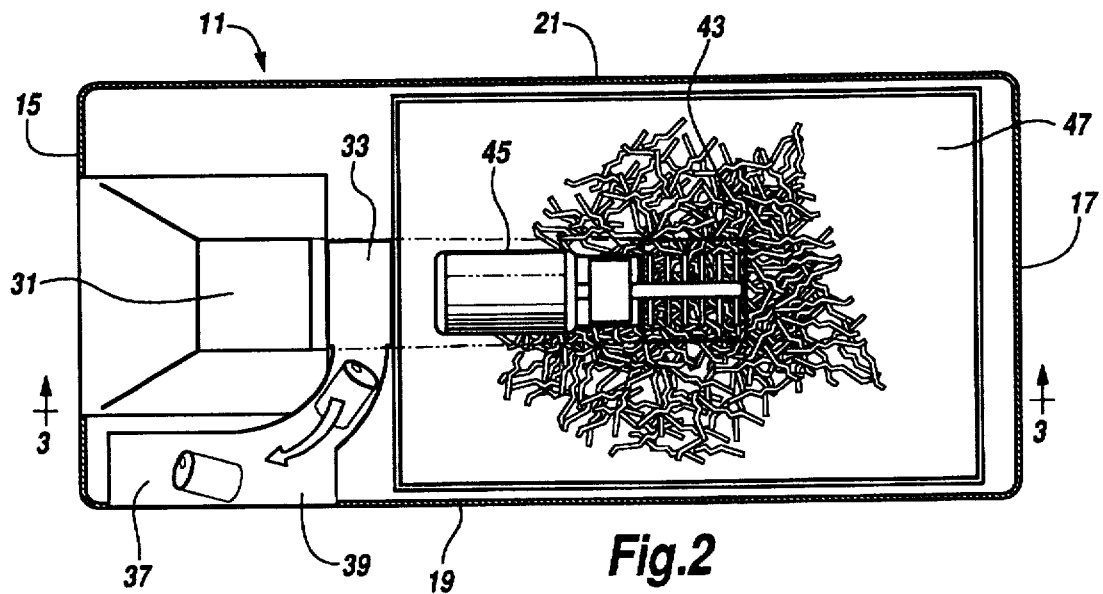
FIG. 2 is a top plan view, partially in section, of the automated recycling center of the invention.
Figure 3:
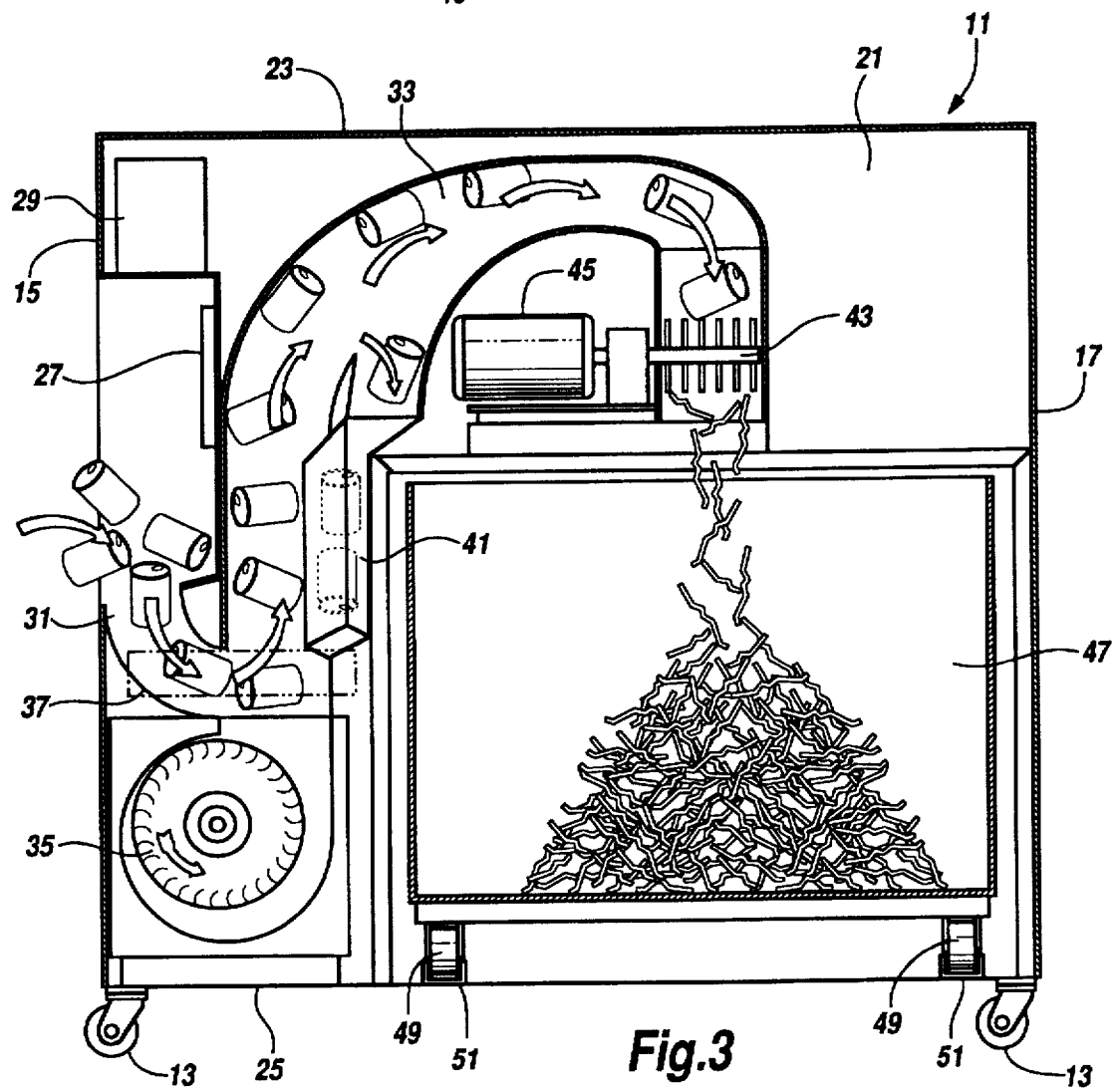
FIG. 3 is a cross sectional view of the automated recycling center of the invention, as seen along lines 3—3 in FIG. 2.

The preferred embodiment of the automated recycling center of the invention is shown in FIGS. 1–3. The center is housed within an outer container 11 that is about 36 inches (0.9 meters) wide, about six feet, five inches (2.0 meters) tall, and about six feet (1.8 meters) long. The outer container 11 is mounted on four wheels 13, so that the center can be easily moved. The outer container 11 has a front 15, a rear 17, a left side 19, a right side 21, a top 23, and a bottom 25. The center is thus fully self-contained, and can be easily installed by rolling the container 11 into place and plugging the center into a 110 volt power source.

A user interface 27 is located on the front 15 of the outer container 11 for allowing a user to operate the center. The user interface 27 would use components well known in the art, and so will not be described in detail. The interface 27 might be very similar to prior art automated recycling centers. The interface 27 and the other components of the recycling center would be controlled by a microprocessor 29 located within the outer container 11, as shown in FIG. 3.

The front 15 of the outer container 11 would also contain an input slot 31, where aluminum cans can be fed into the recycling center. The input slot 31 allows the aluminum cans to fall downward into the outer container 11.

As the cans fall into the outer container 11, they enter a chute 33. The chute 33 travels upward and rearward through the outer container 11, as shown in FIG. 3. A squirrel cage blower 35, located below the chute 33, blows air through the chute, creating a air pressure to force the aluminum cans to fly through the chute 33.

If a particular can is much too heavy, it will not be blown through the chute 33. Rather, the heavy can will fall through a primary rejection chute 37. The primary rejection chute 37 directs the heavy can to an exit slot 39, located on the left side 19 of the outer container 11. The user can then retrieve the heavy cans. In some cases the can may have contents that can be removed to allow the can to be accepted. Other unacceptable objects, such as rocks, will also be very much too heavy, and will be rejected through the primary rejection chute 37.

Some acceptable items will be light enough to bypass the primary rejection chute 37. These items may include cans with small rocks, water, or leftover beverage still in the cans. These cans will be blown past the primary rejection chute 37 upward and rearward. As the slightly too heavy items near the top of the chute 33, they will fall into a secondary rejection chute 41. The secondary rejection chute 41 directs the slightly too heavy cans downward to the exit slot 39.

The cans that are acceptable will be blown completely through the chute 33 to a shredder 43. The shredder 43 is a common metal shredder of a type well known in the art, powered by a motor 45.

The airflow through the chute 33 can be adjusted, so that only acceptable aluminum cans are blown through the chute, and unacceptable material falls through one of the rejection chutes 37 or 41. The precise adjustability of the blower 35 and the chute 33 make the recycling center extremely accurate.

The cans that reach the shredder 43 are shredded into small pieces, and the pieces fall downward into a collection box 47. The collection box 47 is supported by four wheels 49 and can hold up to 500 pounds of shredded aluminum. The wheels 49 of the collection box 47 rest on a load cell 51 that acts as a scale to weigh the collection box 47 and its contents. The automated recycling center can thus gauge the weight of the acceptable aluminum that has been placed into the apparatus. The microprocessor can then process this information and issue a receipt or the correct payment to the user.

Periodically, the recycling center must be emptied. A pair of doors 53 on the left side 19 of the container 11 allow access to the collection box 47. The doors 53 can be opened, and the collection box 47 can be rolled out of the outer container 11. The collection box 47 can then be emptied into a truck, or a new collection box 47 can be rolled into the container 11.

The automated recycling center of the invention has several advantages over the prior art. The use of air pressure to separate the aluminum cans from unacceptable material is very accurate. Also, the use of air pressure to transport the cans is much more reliable than prior art conveyor belts. Overall, the recycling center of the invention is reliable, accurate, clean, quiet, and relatively inexpensive.

The invention has been described in only one embodiment. It should be apparent to those skilled in the art that the invention is not so limited, but is susceptible to various changes and modifications without departing from the spirit of the invention. For example, the invention can also be used to recycle materials other than cans, and can be used to accept material other than aluminum.

I claim:

1. An automatic recycling center for collecting aluminum cans, comprising:
    an outer container having an input slot where metal cans can be placed into the outer container;
    a motorized shredder mounted within the outer container for shredding the metal cans;
    a collection box within the outer container for collecting shredded cans;
    a duct connecting the input slot to the shredder;
    a blower for creating an airflow through the duct to carry the metal cans from the input slot to the shredder;
    a primary rejection chute for separating out material that is too heavy to pass through the duct; and
    a secondary rejection chute for separating out material that is light enough to pass the primary rejection chute, but too heavy to pass through the duct to the shredder.

2. An automatic recycling center as recited in claim 1, wherein the input slot is located on a front surface of the outer container, the blower is located below the input slot, and the duct travels upward and rearward from the blower to the shredder.

3. An automatic recycling center as recited in claim 1, further comprising:
    a plurality of wheels mounted on the collection box;
    a door on the outer container for providing access to the collection box; and
    a scale mounted in the outer container under the wheels for measuring the weight of the collection box and shredded cans in the collection box.

4. An automatic recycling center for collecting aluminum cans, comprising:
    an outer container having an input slot where metal cans can be placed into the outer container;
    a motorized shredder mounted within the outer container for shredding the metal cans;
    a collection box within the outer container for collecting shredded cans;
    a duct connecting the input slot to the shredder, wherein the duct travels in an arch upward and rearward through the outer container; and
    a blower for creating an airflow through the duct to carry the metal cans from the input slot to the shredder.

5. An automatic recycling center as recited in claim 4, further comprising a primary rejection chute for separating out material that is too heavy to pass through the duct.

6. An automatic recycling center as recited in claim 4, further comprising:
    a primary rejection chute for separating out material that is too heavy to pass through the duct; and
    a secondary rejection chute for separating out material that is light enough to pass the primary rejection chute, but too heavy to pass through the duct to the shredder.

7. An automatic recycling center for collecting aluminum cans, comprising:
    an outer container having an input slot where metal cans can be placed into the outer container;
    a motorized shredder mounted within the outer container for shredding the metal cans;
    a collection box within the outer container for collecting shredded cans;
    a duct connecting the input slot to the shredder, wherein the duct narrows as it extends from the input slot to the shredder; and
    a blower for creating an airflow through the duct to carry the metal cans from the input slot to the shredder.

8. An automatic recycling center as recited in claim 7, further comprising a primary rejection chute for separating out material that is too heavy to pass through the duct.

9. An automatic recycling center as recited in claim 7, further comprising:
    a primary rejection chute for separating out material that is too heavy to pass through the duct; and
    a secondary rejection chute for separating out material that is light enough to pass the primary rejection chute, but too heavy to pass through the duct to the shredder.

* * * * *